(12) United States Patent
Engel et al.

(10) Patent No.: US 8,166,907 B2
(45) Date of Patent: May 1, 2012

(54) MOTOR VEHICLE DISPLAY INSTRUMENT HAVING AN EMBRACING INDICATOR

(75) Inventors: Kristian Engel, Waldbronn (DE);
Manfred Süss, Remchingen (DE);
Martin Mayer, Sinsheim (DE)

(73) Assignee: Johnson Controls Automotive, Remchingen (DE)

( * ) Notice: Subject to any disclaimer, the term of this patent is extended or adjusted under 35 U.S.C. 154(b) by 124 days.

(21) Appl. No.: 12/525,759

(22) PCT Filed: Feb. 1, 2008

(86) PCT No.: PCT/EP2008/000819
§ 371 (c)(1),
(2), (4) Date: Nov. 6, 2009

(87) PCT Pub. No.: WO2008/095651
PCT Pub. Date: Aug. 14, 2008

(65) Prior Publication Data
US 2010/0058976 A1    Mar. 11, 2010

(30) Foreign Application Priority Data

Feb. 7, 2007 (DE) .................. 10 2007 006 823
Mar. 1, 2007 (DE) .................. 10 2007 010 443
Jul. 12, 2007 (DE) .................. 10 2007 032 851

(51) Int. Cl.
*G01D 13/22* (2006.01)
*G01D 11/08* (2006.01)
*G01P 1/08* (2006.01)

(52) U.S. Cl. ........ 116/297; 116/332; 116/284; 116/330; 116/DIG. 6

(58) Field of Classification Search ............. 116/284, 116/285, 288, 297, 303, 327, 328, 330–333, 116/DIG. 6, 62.1, 62.3, 62.4; 73/496
See application file for complete search history.

(56) References Cited

U.S. PATENT DOCUMENTS

| | | | | |
|---|---|---|---|---|
| 2,613,629 A | * | 10/1952 | Maybarduk | 116/300 |
| 2,660,147 A | * | 11/1953 | Bowditch | 116/331 |
| 2,793,607 A | * | 5/1957 | Brown et al. | 116/332 |
| 4,274,358 A | * | 6/1981 | Nakamura et al. | 116/288 |
| 5,205,635 A | | 4/1993 | VanOrder et al. | |
| 5,697,322 A | * | 12/1997 | Hay et al. | 116/286 |

(Continued)

FOREIGN PATENT DOCUMENTS

DE    839104 C    5/1952

(Continued)

OTHER PUBLICATIONS

PCT Search Report, PCT/EP2008/000819, dated Nov. 13, 2008, published as WO2008/095651.

(Continued)

*Primary Examiner* — Amy Cohen Johnson
(74) *Attorney, Agent, or Firm* — Dobrusin & Thennisch PC

(57) ABSTRACT

The invention provides a display instrument, particularly for a motor vehicle, having an indicator that is rotatable about a rotational axis, wherein the indicator has an inner first region that is radial with regard to the rotational axis and that is not visible to a user, and an outer second region that is radial with regard to the rotational axis and that is visible to a user, wherein at a radial distance from the rotational axis an additional mounting of the indicator and/or a stop for receiving tilting moments positioned substantially perpendicular on the rotational axis are provided.

13 Claims, 3 Drawing Sheets

U.S. PATENT DOCUMENTS

Figure 1:
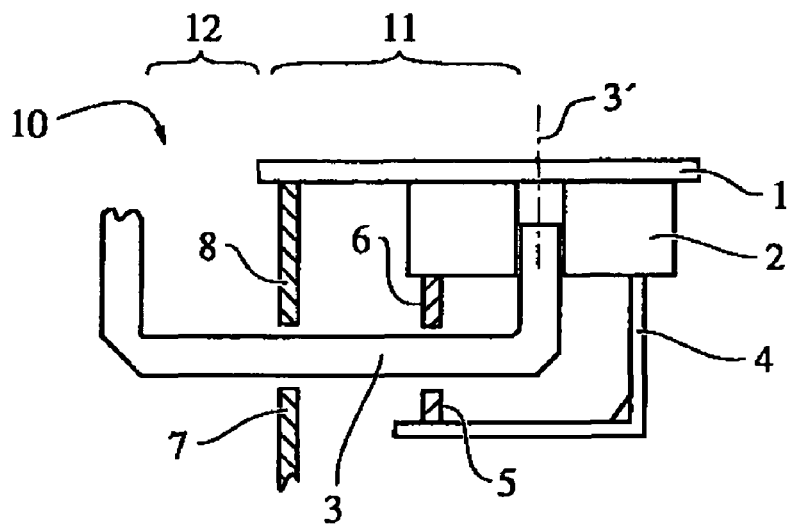

| | | | |
|---|---|---|---|
| 5,803,240 A | 9/1998 | Swindersky et al. | |
| 6,062,063 A * | 5/2000 | Robson | 73/1.88 |
| 6,178,917 B1 * | 1/2001 | Jansa | 116/286 |
| 6,417,779 B1 | 7/2002 | Noll et al. | |
| 6,598,988 B1 | 7/2003 | Noll et al. | |
| 6,817,310 B2 | 11/2004 | Sugiyama et al. | |
| 7,098,897 B2 | 8/2006 | Vakil et al. | |
| 7,159,534 B2 * | 1/2007 | Tanaka et al. | 116/300 |
| 7,221,363 B2 | 5/2007 | Roberts et al. | |
| 2005/0052426 A1 | 3/2005 | Hagermoser et al. | |
| 2005/0134485 A1 | 6/2005 | Hein et al. | |
| 2006/0035073 A1 | 2/2006 | Funkenbusch et al. | |
| 2006/0132383 A1 | 6/2006 | Gally et al. | |

FOREIGN PATENT DOCUMENTS

| | | |
|---|---|---|
| DE | 3149826 A1 | 7/1983 |
| DE | 4321146 A1 | 1/1995 |
| DE | 4321416 A1 | 1/1995 |
| DE | 19544578 A1 | 6/1997 |
| DE | 19737679 A1 | 3/1999 |
| DE | 19739628 A1 | 3/1999 |
| DE | 19831893 A1 | 1/2000 |
| DE | 20021111 U1 | 1/2001 |
| DE | 10134365 A1 | 1/2003 |
| DE | 102005003919 A1 | 9/2005 |
| DE | 102005055906 A1 | 5/2007 |
| EP | 1758070 A2 | 2/2007 |
| EP | 1839945 A1 | 10/2007 |
| EP | 2110834 A1 | 10/2009 |
| FR | 2679988 A1 | 2/1993 |
| FR | 2871230 A1 | 12/2005 |
| JP | 2003014508 A | 1/2003 |
| WO | 2004/102127 A1 | 11/2004 |
| WO | 2006/002474 A1 | 1/2006 |
| WO | 2006/005821 | 1/2006 |
| WO | 2008/086215 A2 | 7/2008 |
| WO | 2009/150546 A2 | 12/2009 |
| WO | 2010/025160 A1 | 4/2010 |

OTHER PUBLICATIONS

International Preliminary Report on Patentability, Application No. PCT/EP2008/000819, mailed Sep. 17, 2009.

German Office Action, Application No. 10 2007 032 851.8, mailed Apr. 11, 2008.

Co-pending U.S. Appl. No. 12/528,214, filed Aug. 21, 2009.

* cited by examiner

MOTOR VEHICLE DISPLAY INSTRUMENT HAVING AN EMBRACING INDICATOR

CLAIM OF BENEFIT OF FILING DATE

The present application claims the benefit of the filing date of PCT Application Serial No. PCT/EP2008/000819 (filed Feb. 1, 2008) (Published as WO 2008/095651); DE 10 2007006 823.0 (filed Feb. 7, 2007), DE 10 2007 010 443.1 (filed Mar. 1, 2007); and DE 10 2007 032 851.8 (filed Jul. 12, 2007), the contents of which are hereby incorporated by reference in their entirety.

The invention relates to an instrument for a motor vehicle, in which the greater part of a pointer which is mounted by means of a centrally arranged rotational axle is covered by an instrument component. In particular, the end of the pointer which is remote from the rotational axle encompasses the edges of the instrument component, as a result of which the tip of the pointer is visible. Such a pointer does not make use of the central zone of the visible region of an instrument, providing an unimpeded view of the instrument component, which can be embodied, for example, as a matrix display.

Such pointers, which cover a central zone of the visible region of an instrument, are known, for example, from documents WO 2006/005821 A1, JP 2003-014508, DE 197 39 628 or WO 2006/02474 A1. However, the protruding pointer design which this requires entails either a weight problem or a stability problem for the pointer. If a pointer is made very lightweight, it is susceptible to vibrations of the pointer tip. If the stability is improved, the loading on the rotational axle increases due to the long lever arm which acts on said rotational axle, and as a result the drive (engine or transmission) has to be made more robust and therefore becomes more expensive.

The invention has the object of making available a display instrument with improved resistance to shocks and vibrations.

The object is achieved by means of a display instrument, in particular for a motor vehicle, having a pointer which can rotate about a rotational axle, wherein the pointer has a first region which is radially on the inside with respect to the rotational axle and cannot be seen by a user, and a second region which is radially on the outside with respect to the rotational axle and can be seen by a user, wherein, at a radial distance from the rotational axle, an additional mount of the pointer and/or a stop are provided for taking up tilting moments which are essentially perpendicular to the rotational axle. According to a first embodiment, the additional mount is implemented by adding at least one further mount element to the mounting means for the rotational axle which are provided in the drive, while according to a second embodiment the additional mount is implemented by limiting the possible tilt angle of the pointer in relation to the spatial position of the unloaded rotational axle by surrounding the pointer shaft with a washer near to the drive block, which washer comes to bear on the counterpart which is attached to the drive block. This makes it possible overall both to equip the pointer in a comparatively lightweight fashion and therefore also to equip it with a moment of mass inertia which is small and can be easily rotated, as well as to ensure a comparatively stable arrangement of the pointer, in particular in surroundings in which vibrations of various types (strength and frequency) occur, as is the case in motor vehicles. According to the invention it is advantageously possible for an analog pointer which can rotate about a rotational axle to have very easy movement, a high degree of resistance to vibrations and also a high level of positioning accuracy with respect to adjacent components such as, for example, the dial located adjacent to or opposite the pointer tip.

In the first embodiment, in particular an additional holding angle piece is provided which is attached to or near to the drive housing, with the limb of the angle or of the holding angle piece which is parallel to the rotational axle being located in the circular sector over which the movement of the pointer does not pass. As a result it is possible for the pointer to be mounted or held at two different positions in the axial direction of the rotational axle of the pointer, with the two locations which are spaced apart in the axial direction of the rotational axle of the pointer being preferably located on the one side and the other side of the plane of movement or the cone of movement of the pointer. In a first subtype of this embodiment, a bearing bushing is provided in the angle piece in order to implement the additional mount, with the end of the drive shaft—which is also to be understood as a correspondingly constructed end piece of a pointer which is fitted (e.g. plugged) into a shaftless drive—which faces away from the drive side being mounted in the bearing bushing. This end piece can be embodied from the same material as the pointer material or can be formed from a material of higher strength. In a second subtype of this embodiment (which can be provided as an alternative or an addition to the first subtype), the holding angle piece is fitted with a ring which extends counter to the pointer and is configured with low sliding friction, at least at its potential contact surface with the pointer, specifically its end wall which is embodied as a flat contact track, this low friction being due to the selection of the ring material or to a coating, for example with nanoparticles or Teflon. On the opposite side of the pointer, an identical ring can be provided which is attached, for example, to the drive housing. As a result, a limiting stop, which counteracts swinging of the pointer through excitation of shocks or vibrations, is provided on both sides. This implements a stop for taking up tilting moments which are essentially perpendicular to the rotational axle. According to a further variant of a stop (which can be implemented alternatively or additionally to the other variants or embodiments) for taking up tilting moments which are essentially perpendicular to the rotational axle, a limiting stop or pair of limiting stops can also be arranged further away from the rotational axle, depending on the available installation space or the inherent resonant behavior of the pointer. A holding angle piece is not absolutely necessary for this.

In the second embodiment it is advantageous if the contact surface, which is punctual, sectoral or runs around in a circular path depending on the load case, is effective at a considerable distance from the rotational axle so that the opposing force counteracting the tendency to tilt remains as small as possible owing to the lever laws; this is because the frictional losses occurring as a result of the contact surface increase proportionally to the force with which the pointer washer and its counterpart are pressed one on top of the other. In one configuration of the invention according to the second embodiment, the tilt angle is restricted to a value of precisely or virtually zero degrees due to permanent contact between the washer and the counterbearing. A lubricant can be introduced in the region of the contact surface or a friction-reducing coating may be provided, for example a PTFE (polytetrafluoroethylene, Teflon) coating or the like. As an alternative to this, rolling bodies may be introduced in the region of the contact surface, which rolling bodies are held on the circular path by a depression, formed as a circular channel, in the washer or the counterbearing.

The measures presented in the various embodiments can also be combined with one another.

According to the invention it is preferred, in particular, if the pointer bears in a continuously sliding fashion on the additional mount and/or on the stop. As a result, comparatively simple means can be used to implement a comparatively stable mount which also has a high degree of resistance to shocks. It is particularly preferred here if the pointer is mounted in an easily moving fashion or bears in an easily moving fashion on the additional mount and/or on the stop by means of a lubricant or a friction-reducing coating, in particular a PTFE layer (Teflon layer). As a result, the frictional forces which for a movement of the pointer about the rotational axle owing to the continuous additional mounting or owing to the merely temporary bearing on the stop, can be reduced to a considerable degree and with comparatively little effort.

According to the invention, it is also particularly preferred if the pointer bears in a continuous fashion on the additional mount and/or on the stop by means of a rolling body. As a result, frictional force for moving the pointer about the rotational axle can be reduced to an even greater degree. However, the mount can also be embodied in such a way that contact occurs between the guide region of the pointer and the limiting element only if shocks occur.

It is particularly preferred if a rotational axle bearing which is remote from the drive block is provided as the additional mount or if a washer and a counterpart are provided as the additional mount. As a result it is possible to implement the additional mount with structurally simple means.

Furthermore it is preferred according to the invention that first limiting stops and/or second limiting stops are provided as the stop. As a result it is particularly advantageously possible for the pointer to be rotated both in a particularly easily moving fashion about the rotational axle in the normal operating mode, i.e. when the vibration loading is not excessively large, and for effective and continuously acting protection against excessive vibration loading or shock loading to be implemented with very simple means.

According to the invention it is particularly advantageous if the pointer is embodied, for example, as a hook-type pointer. As a result a wide variety of types and forms of pointer can be implemented in the display instrument according to the invention.

FIGURES

Figure 2:
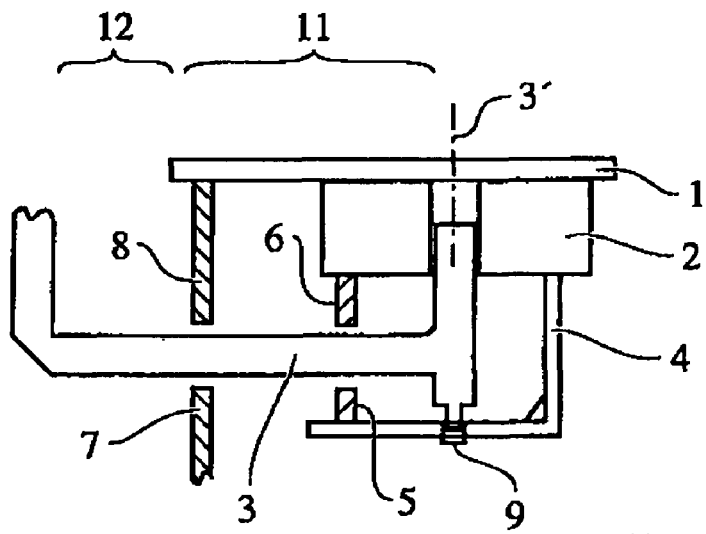
Figure 3:
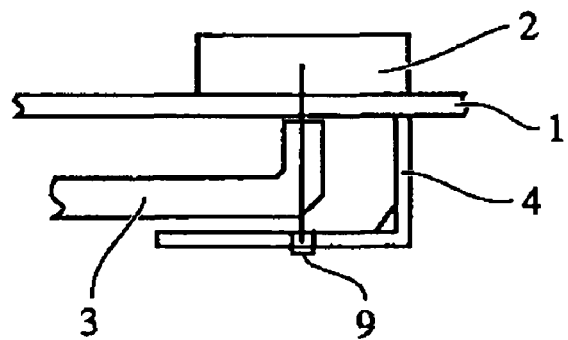

FIGS. 1 to 3 show embodiment variants of a first embodiment of the attachment of a pointer in a display instrument according to the invention, and FIGS. 4 to 8 show embodiment variants of a second embodiment of the attachment of a pointer in a display instrument according to the invention.

FIGS. 1, 2 and 3 show, in a display instrument 10 according to the invention, a drive 2 or motor 2 which is arranged on a printed circuit board 1 and is capable of rotating a pointer 3, as well as a holding angle piece 4. The base of the pointer itself can be plugged into the drive (FIGS. 1 and 2) or it can surround a metal shaft (not provided with its own reference symbol) of the drive (FIG. 3). Furthermore, FIGS. 1 and 2 show first limiting stops 5, 6 and second limiting stops 7, 8, and a first region 11, which is not visible, of the pointer 3 and a second region 12, which is visible, of the pointer 3. Moreover, a rotational axle bearing 9 which is remote from the drive block is held by a holding angle piece 4 in FIGS. 2 and 3. The distance between the first limiting stops 5, 6 and the pointer 3 or the distance between the second limiting stops 7, 8 and the pointer is provided to be greater than zero in a normal case (i.e. in a situation in which no tilting moments which extend perpendicularly to the rotational axle 3' and are dynamic, i.e. are due to an external force effect such as vibrations or the like) so that there is no continuous abutment between the pointer 3 and the limiting stops 5, 6, 7, 8. The limiting stops therefore serve as a stop for taking up tilting moments which are substantially perpendicular to the rotational axle 3', with the stop being provided at a radial distance from the rotational axle 3'.

Figure 4:
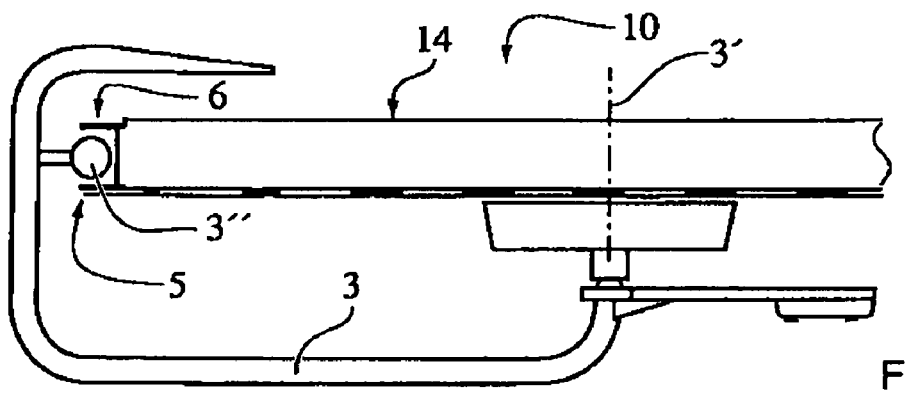
Figure 5:
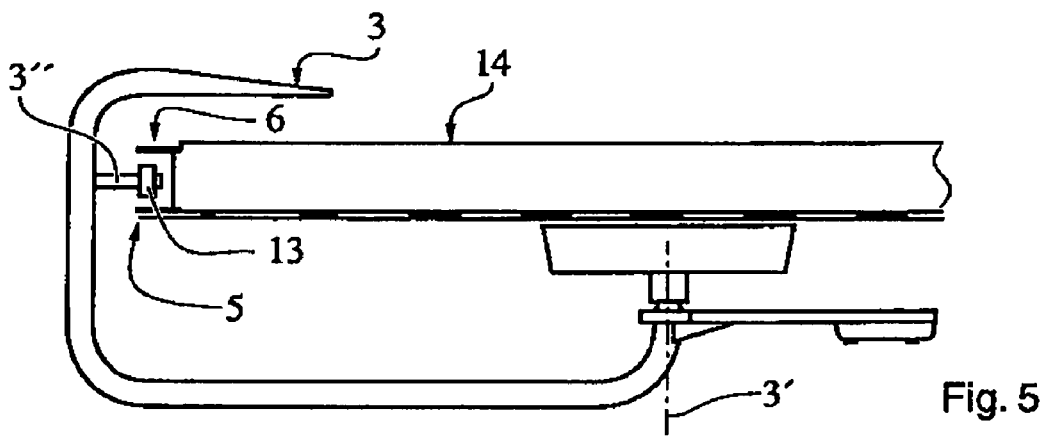
Figure 6:
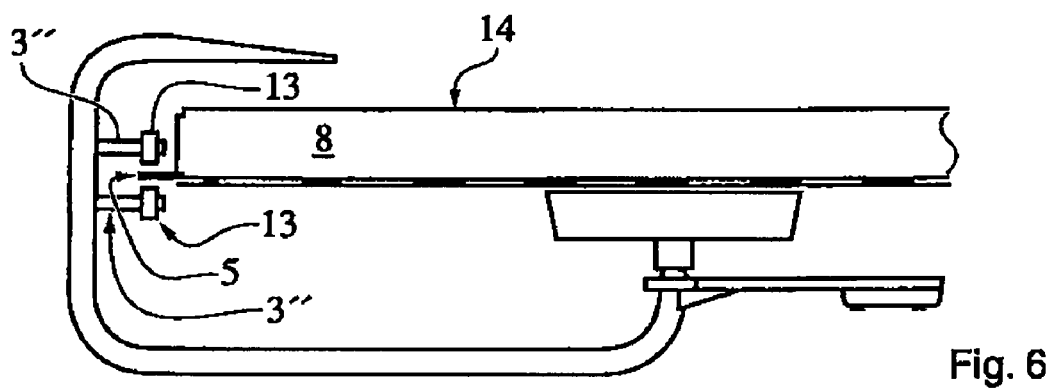
Figure 7:
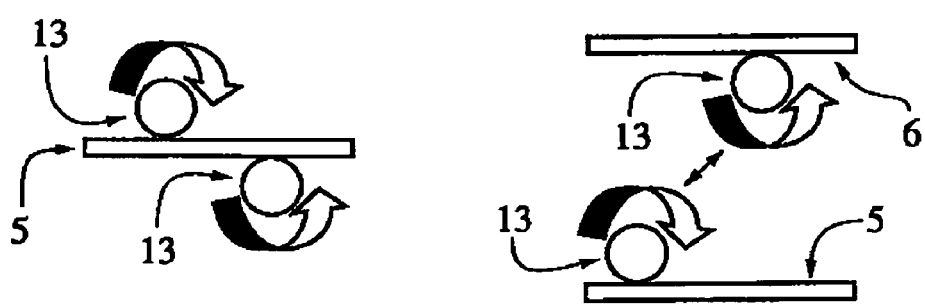

According to the refinements of the first embodiment of the attachment of the pointer 3 in the display instrument 10 according to the invention which are illustrated in FIGS. 4 to 7, variants of the stop of the pointer 3 are illustrated which contrast with a region 14 (in particular the dial) which is fixed (i.e. cannot move about the rotational axle 3'). In this context, the pointer 3 in FIG. 4 is guided in a region between the limiting stops 5, 6 which also lies comparatively far toward the outside in the radial direction, wherein the pointer 3 has for this purpose a guide section 3" which is guided between the limiting stops 5, 6. In order to reduce the friction (in the case of a tilting moment, which acts on the pointer 3 and runs substantially perpendicularly to the rotational axle 3', in such a way that the guide section 3" comes to bear on one of the limiting stops 5, 6), one or more friction-reducing measures can be implemented on this guide section 3" or at the locations of the limiting stops 5, 6 lying opposite, said measures being, for example, corresponding shaping with a small contact surface—for example by means of a ball indicated in FIG. 4 as the shape of the outermost end of the guide section 3"—or else a friction-reducing surface configuration or surface coating. In order to reduce the friction it is also alternatively possible to provide a rolling body 13, which is preferably arranged on the guide section 3". In this context, the example of a rolling body 13—for example of a small roller—on the guide section 3" is illustrated in FIG. 5 and in the righthand part of FIG. 7, with the rolling body 13 bearing either on the upper limiting stop 6 (when a corresponding tilting moment is present) or else on the lower limiting stop 5 and rolling in order to reduce the friction. The example of two rolling bodies 13 on a guide section 3" which appears divided in two is illustrated in FIG. 6 and in the lefthand part of FIG. 7, with two rolling bodies 13 being present and rolling on the limiting stop 5 in order to reduce friction. In this context it is either possible to provide that the two rolling bodies 13 continuously bear on the limiting stop 5, i.e. in the sense of the invention the pointer is (continuously) supported on the limiting stop 5. Alternatively, the rolling bodies 13 can be provided spaced apart from the limiting stop 5, which improves the ease of movement of the pointer (but this is not illustrated in FIG. 6 or the lefthand part of FIG. 7).

Figure 8:
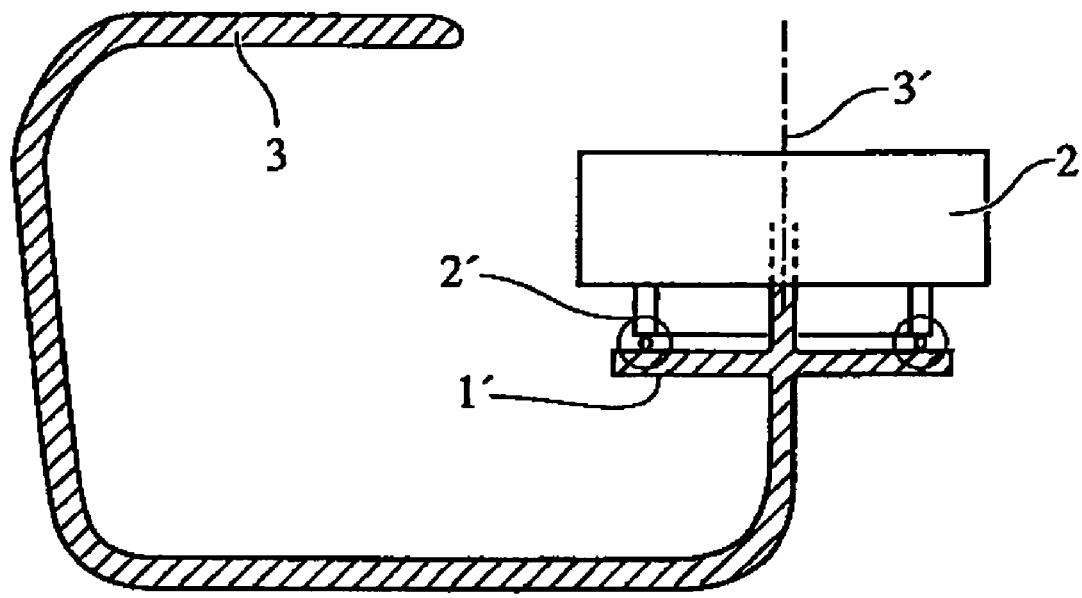

The arrangement of a washer 1' which encompasses the shaft of the pointer and has a counterpart 2' which interacts with it is shown in FIG. 8 in a sectional illustration through a display instrument according to the invention, and the details of the sketch here are not necessarily to be understood as true to scale: the distance between the washer 1' and the counterpart 2' which can be clearly seen here can be made significantly smaller or negligibly small depending on the design. If the distance between the washer 1' and the counterpart 2' is greater than zero in a normal case (i.e. in a situation in which no dynamic tilting moments—i.e. due to an external force effect such as vibrations or the like—extending perpendicularly with respect to the rotational axle 3' act on the pointer 3), that is to say where there is no continuous abutment between the washer 1' and the counterpart 2', the washer 1' and the counterpart 2' serve as a stop for taking up such tilting moments which are essentially perpendicularly to the rotational axle, with the stop being provided at a radial distance from the rotational axle 3'. If the distance between the washer 1' and the counterpart 2' is zero in a normal case, there being continuous abutment between the washer 1' and the counterpart 2', the washer 1' and the counterpart 2' then act as an additional mount which is provided at a radial distance from the rotational axle 3'.

List Of Reference Numerals
1 Metal blank/printed circuit board
1' Washer
2 Drive/motor
2' Counterpart
3 Pointer
3' Rotational axle
4 Holding angle piece
5, 6 First limiting stops
7, 8 Second limiting stops
9 Rotational axle bearing remote from drive block
10 Display instrument
11 First region of the pointer which is not visible
12 Second region of the pointer which is visible
13 Rolling body
14 Fixed region of the display instrument/dial

The invention claimed is:

1. A display instrument, useful in a motor vehicle, having a pointer which can rotate about a rotational axle, wherein the pointer has a first region which cannot be seen by a user, and a second region which can be seen by a user, characterized in that, at a radial distance from the rotational axle, the pointer further comprises one or more guide sections which are located adjacent to one or more stops wherein the one or more guide sections comprise a ball or a rolling body.

2. A display instrument according to claim 1 wherein the ball or rolling body of the guide sections bear on one or more stops.

3. A display instrument according to claim 1 wherein the one or more guide sections are disposed between two of the stops.

4. A display instrument according to claim 3 wherein the guide sections comprise a ball or a rolling body.

5. A display instrument according to claim 1 wherein the pointer contains two of the one or more guide sections and one of the stops is located between the guide sections.

6. A display instrument useful in a motor vehicle, having a pointer which can rotate about a rotational axle, wherein the pointer has a first region which cannot be seen by a user, and a second region which can be seen by a user, characterized in that at a radial distance from the rotational axle, one or more of an additional mount of the pointer or a stop are provided for taking up tilting moments which are essentially perpendicular to the rotational axle and that the pointer is a hook-type pointer; wherein and the pointer bears continuously on the one or more stops by means of a rolling body.

7. The display instrument as claimed in claim 6, characterized in that the pointer bears in a continuous sliding fashion on the additional mount and/or on the stop.

8. The display instrument as claimed in claim 7, characterized in that the pointer is mounted in an easily moving fashion or bears in an easily moving fashion on the additional mount and/or on the stop by means of a lubricant or a friction-reducing coating.

9. The display instrument as claimed in claim 8, characterized in that the lubricant or the friction-reducing coating is a PTFE layer.

10. The display instrument as claimed in claim 6, characterized in that a washer and a counterpart are provided as the additional mount.

11. The display instrument as claimed in claim 6, characterized in that first limiting stops and/or second limiting stops are provided as the stop.

12. The display instrument as claimed in claim 6, characterized in that the pointer bears in a continuous sliding fashion on the one or more stops.

13. The display instrument as claimed in claim 6, characterized the one or more stops comprise one or more first limiting stops and one or more second limiting stops.

* * * * *